(12) United States Patent
Sarraf et al.

(10) Patent No.: US 12,066,336 B2
(45) Date of Patent: Aug. 20, 2024

(54) ISOLATED TEMPERATURE SENSING FOR HEMS CONTACTS

(71) Applicant: TE Connectivity Solutions GmbH, Schaffhausen (CH)

(72) Inventors: David Bruce Sarraf, Elizabethtown, PA (US); Marjorie Kay Myers, Mount Joy, PA (US); Mark Wartenberg, Fremont, CA (US)

(73) Assignee: TE Connectivity Solutions GmbH (CH)

( * ) Notice: Subject to any disclaimer, the term of this patent is extended or adjusted under 35 U.S.C. 154(b) by 0 days.

(21) Appl. No.: 18/168,098

(22) Filed: Feb. 13, 2023

(65) Prior Publication Data

US 2023/0194355 A1 Jun. 22, 2023

Related U.S. Application Data

(62) Division of application No. 16/295,414, filed on Mar. 7, 2019, now Pat. No. 11,714,008.

(51) Int. Cl.
*G01K 7/02* (2021.01)
*B60L 53/16* (2019.01)
(Continued)

(52) U.S. Cl.
CPC .............. *G01K 7/023* (2013.01); *B60L 53/16* (2019.02); *B60L 53/302* (2019.02); *G01K 5/52* (2013.01);
(Continued)

(58) Field of Classification Search
CPC ............ G01K 7/023; G01K 5/52; G01K 7/16; G01K 11/12; G01K 7/36; B60L 53/16;
(Continued)

(56) References Cited

U.S. PATENT DOCUMENTS

| 5,547,283 A | * | 8/1996 | Kronberg | ................. G01K 1/14 |
| | | | | 374/E11.02 |
| 7,118,407 B2 | * | 10/2006 | Ching | ................ H01R 13/6608 |
| | | | | 439/911 |

(Continued)

FOREIGN PATENT DOCUMENTS

| DE | 102013106726 A1 | 12/2014 |
| DE | 102016115678 A1 | 3/2018 |

(Continued)

OTHER PUBLICATIONS

Giral-Castillion et al. "Conventional Cars" Handbook of Automotive Power of Electronics and Motor Drives, CRC Press, Taylor & Francis Group, Boca Raton, FL, Jan. 1, 2005.

(Continued)

*Primary Examiner* — Tran M. Tran
*Assistant Examiner* — Philip L Cotey

(57) ABSTRACT

A method of detecting temperature of an electrical terminal. The method includes: applying a material patch to a surface of the electrical terminal, the material patch containing a polymer matrix with a polymeric positive temperature coefficient material which contains a mixture of electrically conductive magnetic particles, whereby the material patch does not appreciably increase the electrical resistance or thermal capacitance of the electrical terminal; and remotely sensing a change in the material patch with an electrically isolated circuit which is external to the electrical terminal to determine if the electrical terminal is operating at a safe temperature to optimize current flow across the electrical terminal.

20 Claims, 4 Drawing Sheets

(51) Int. Cl.
*B60L 53/302* (2019.01)
*G01K 5/52* (2006.01)
*G01K 7/16* (2006.01)
*G01K 7/36* (2006.01)
*G01K 11/12* (2021.01)
*B60L 53/62* (2019.01)
*C09D 11/50* (2014.01)
*G09F 3/00* (2006.01)
*H01R 13/66* (2006.01)

(52) U.S. Cl.
CPC ............ *G01K 7/16* (2013.01); *G01K 11/12* (2013.01); *B60L 53/62* (2019.02); *C09D 11/50* (2013.01); *G01K 7/36* (2013.01); *G09F 3/0294* (2013.01); *H01R 13/6683* (2013.01); *Y02T 10/70* (2013.01); *Y02T 10/7072* (2013.01); *Y02T 90/12* (2013.01); *Y02T 90/14* (2013.01)

(58) Field of Classification Search
CPC ........ B60L 53/302; B60L 53/62; C09D 11/50; G09F 3/0294; H01R 13/6683; Y02T 10/70; Y02T 10/7072; Y02T 90/12; Y02T 90/14
See application file for complete search history.

(56) References Cited

U.S. PATENT DOCUMENTS

| | | | | |
|---|---|---|---|---|
| 9,615,407 | B2* | 4/2017 | Pankratz | H05B 6/06 |
| 10,302,506 | B2* | 5/2019 | Sekitani | C09D 5/24 |
| 10,505,403 | B1* | 12/2019 | Smith | H02J 50/60 |
| 10,746,609 | B2* | 8/2020 | Lee | G01K 7/36 |
| 11,162,849 | B2* | 11/2021 | Mori | G01K 7/22 |
| 2005/0192512 | A1* | 9/2005 | Butterworth | G01K 13/20 |
| | | | | 374/E13.002 |
| 2005/0221674 | A1* | 10/2005 | Ching | H01R 13/6608 |
| | | | | 439/620.21 |
| 2008/0039575 | A1* | 2/2008 | Mercx | C08K 3/04 |
| | | | | 524/496 |
| 2008/0057767 | A1* | 3/2008 | O'Rourke | H01R 31/02 |
| | | | | 439/345 |
| 2008/0063026 | A1* | 3/2008 | Roche | G01K 11/12 |
| | | | | 374/E11.018 |
| 2009/0036304 | A1* | 2/2009 | Misner | C09D 11/50 |
| | | | | 503/201 |
| 2012/0027045 | A1* | 2/2012 | McLellan | G01K 11/06 |
| | | | | 374/161 |
| 2012/0106591 | A1* | 5/2012 | Springer, III | G01K 11/12 |
| | | | | 374/45 |
| 2012/0120167 | A1* | 5/2012 | Poxon | B41J 11/00212 |
| | | | | 374/E11.018 |
| 2015/0255994 | A1* | 9/2015 | Kesler | B60L 53/124 |
| | | | | 307/10.1 |
| 2015/0359887 | A1* | 12/2015 | Riedinger | A61K 31/704 |
| | | | | 534/662 |
| 2016/0031185 | A1* | 2/2016 | Janousek | H01M 10/4285 |
| | | | | 428/209 |
| 2017/0176262 | A1* | 6/2017 | Sekitani | C08L 33/08 |
| 2017/0191020 | A1* | 7/2017 | Recht | C12M 41/12 |
| 2017/0191881 | A1* | 7/2017 | Kiesel | G01K 11/12 |
| 2017/0294679 | A1* | 10/2017 | Sugita | H01M 4/587 |
| 2018/0097264 | A1* | 4/2018 | Doerr | G02B 6/24 |
| 2018/0102232 | A1* | 4/2018 | Ma | H01H 61/04 |
| 2018/0192887 | A1* | 7/2018 | Ye | A61B 5/01 |
| 2018/0198323 | A1* | 7/2018 | Widmer | H02J 50/60 |
| 2019/0323901 | A1* | 10/2019 | Mori | G01K 7/22 |
| 2019/0323902 | A1* | 10/2019 | Gao | H01B 7/36 |
| 2019/0328327 | A1* | 10/2019 | Kim | H04B 5/79 |
| 2020/0041358 | A1* | 2/2020 | Alvarez Raventos | G01K 13/08 |
| 2020/0141814 | A1* | 5/2020 | Lee | G01K 7/36 |
| 2020/0284663 | A1* | 9/2020 | Sarraf | G01K 7/023 |

FOREIGN PATENT DOCUMENTS

| | | |
|---|---|---|
| EP | 2679970 A2 | 1/2014 |
| EP | 3246196 A1 | 11/2017 |
| JP | S58214825 A | 12/1983 |

OTHER PUBLICATIONS

International Search Report for International Application No. PCT/IB2020/051980, Filing Date Mar. 6, 2020.

* cited by examiner

ISOLATED TEMPERATURE SENSING FOR HEMS CONTACTS

CROSS REFERENCE TO RELATED APPLICATIONS

This application is a Divisional of and claims priority to U.S. application Ser. No. 16/295,414 filed on Mar. 7, 2019 which is incorporated herein by reference in its entirety.

FIELD OF THE INVENTION

The present invention is directed a device and method for remote and isolated temperature sensing of an electrical terminal.

BACKGROUND OF THE INVENTION

The current rating of EV charging port connectors is presently limited by contact temperature. The contact temperature approach to connector derating allows the charging system to maximize charging current (and minimize charging time) while avoiding damage to the charging port connector. Key attributes of a suitable temperature sensor include high accuracy, fast response time, and low cost.

The accuracy and response time of traditional sensors such as RTDs or thermocouples can be limited due to their need for electrical isolation from the contact pins. The additional materials required for electrical isolation add thermal resistance and thermal capacitance to the sensing system. The additional resistance contributes to reduced absolute measurement accuracy. The additional thermal resistance and capacitance increase the system time constant, which leads to longer sensor response time.

Prior improvements to temperature sensing were based on a temperature sensor such as a helix of nitinol wire or a capsule of phase change wax that was embedded in the center of the pin. The electrical isolation required for these sensors added no thermal resistance or capacitance, which minimized their response time, and their location in the center of the pin assured high absolute accuracy. However, a drawback of any such embedded sensor is the reduction in pin cross sectional area required to accommodate the sensor volume, which leads to increased electrical resistance and increased ohmic heat generation.

It would, therefore, be beneficial to provide a remote sensing circuit and method in which the components provide electrical isolation without increasing the measurement system time constant, without the reduction in pin cross-sectional area resulting from the prior solutions mentioned above.

SUMMARY OF THE INVENTION

An object is to provide an external circuit and method which senses a temperature-driven change in a material that is applied to the contact. The external circuit does not contact the pin and is therefore electrically isolated. The material is applied directly to the pin surface and adds little or no thermal mass to the system. In combination these two components provide electrical isolation without increasing the measurement system time constant, and they do so without the reduction in pin cross-sectional area.

An embodiment is directed to a method of detecting temperature of an electrical terminal. The method includes: applying a material patch to a surface of the electrical terminal, the thermal mass of the material patch is less than 25 percent, less than 20 percent, less than 15 percent, less than 10 percent, less than 5 percent of the thermal mass of the electrical terminal, whereby the material patch does not appreciably increase the electrical resistance or thermal capacitance of the electrical terminal; and remotely sensing a change in the material patch with an electrically isolated circuit which is external to the electrical terminal to determine if the electrical terminal is operating at a safe temperature to optimize current flow across the electrical terminal.

An embodiment may include reflecting photons of lower energy than a bandgap of the detector when the temperature of the terminal is in an acceptable range, whereby an electric current induced by the action of photocurrent in the detector is low, resulting in little output from the detector.

An embodiment may include reflecting photons of higher energy than a bandgap of the detector when the temperature of the terminal is outside of an acceptable range, whereby an electric current induced by the action of photocurrent in the detector is high, indicating that the temperature of the terminal is outside of the acceptable range.

An embodiment may include: generating photoelectrons based on light generated by the illuminator and reflected from the material patch to the detector; causing current to flow into the op-amp of the detector circuit; and generating a voltage output signal proportional to light flux at the detector through a resistor.

An embodiment may include generating a magnetic field based on the thermal expansion of a polymer matrix, the magnetic field is a non-linear function of temperature.

An embodiment may include exciting the electrically conductive magnetic particles with an AC magnetic field to cause eddy currents to flow within the electrically conductive magnetic particles. Wherein when the polymer matrix is above the designed transition temperature the eddy currents will flow only within each of the electrically conductive magnetic particles and the electrical loss will be relatively low. Wherein when the polymer matrix is below the designed transition temperature and the electrically conductive magnetic particles are in close mechanical contact the eddy currents will flow through the electrically conductive magnetic particles and the polymer matrix and the losses will be significantly higher.

An embodiment may include detecting the change in the polymer matrix dissipative loss by an external circuit that is magnetically coupled to the polymer matrix.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
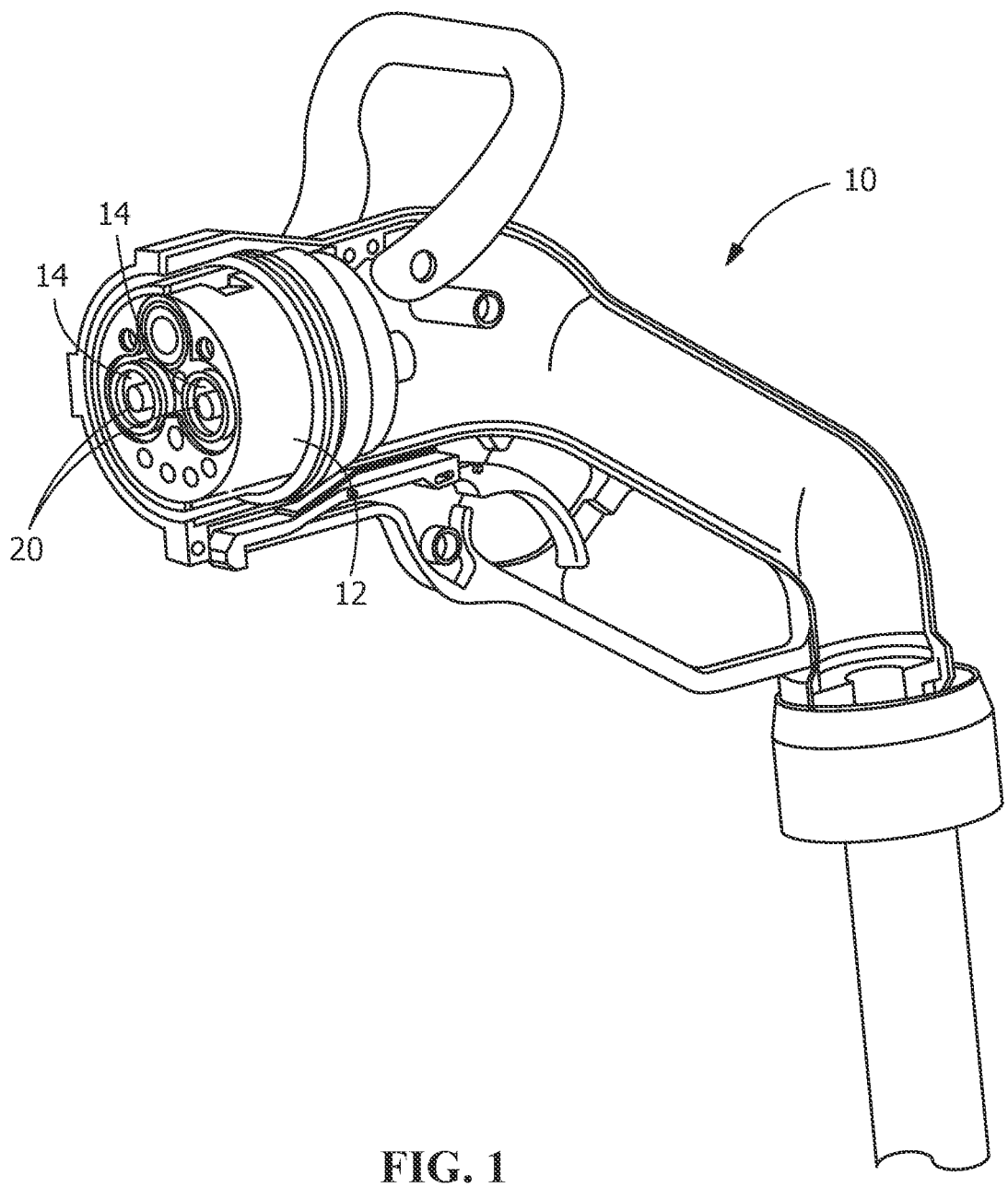
FIG. 1 is a perspective view of an illustrative charging port connector which incorporates electrical terminals and the isolated temperature sensing of the electrical terminals of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Referring to FIG. 1, a representative charging port connector 10 which incorporates electrical terminals 20 and an isolated temperature sensing system, as will be more fully described, for sensing the temperature of the electrical terminals 20 is shown. The connector 10 has a housing 12 with terminal receiving cavities 14 provided therein. The terminal receiving cavities 14 are configured to housing the terminals 20 therein. The particular configuration and shape of the connector may vary without departing from the scope of the invention.

Figure 2:
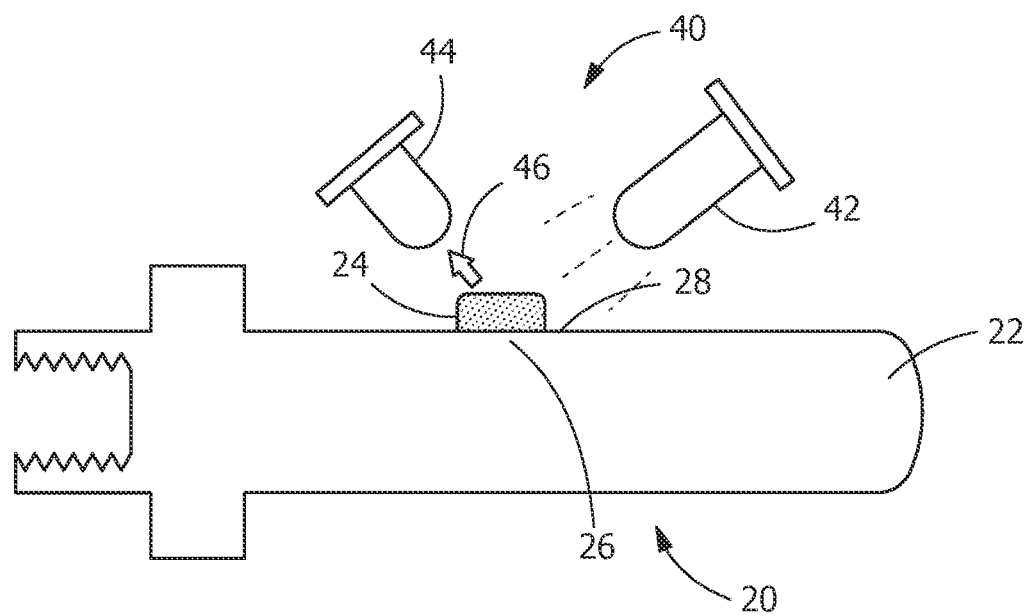
FIG. 2 is a diagrammatic view of an illustrative electrical terminal with a thermochromic material provided thereon and of an illustrative remote temperature sensing system.

In the illustrative embodiment shown in FIG. 2, the terminals 20 are in the shape of pin with a free end 22 which is configured to mate with a mating connector (not shown) which is provided in a vehicle or the like. The size and shape of the terminals 20 may vary depending upon the application and the amount of current which the terminals 20 must carry.

A material patch 24 is applied to an area 26 of each of the terminals 20. The size and shape of the material patch 24 may vary depending upon the application and the amount of current which the terminals 20 must carry. The material patch 24 is applied directly to a surface 28 of each terminal 20 and adds little or no thermal mass to the terminal 20. For example, the material patch 24 may have a length of between 0.6 mm and 10 mm, a width of between 0.6 mm and 10 mm and a thickness of between 0.005 mm and 1 mm. The thermal mass of the material patch 24 is less than 25 percent, less than 20 percent, less than 15 percent, less than 10 percent, less than 5 percent of the thermal mass of the terminal 20.

In the embodiment shown in FIG. 2, the material patch 24 is a thermochromic ink. Thermochromic inks undergo a temperature-driven phase change where the ink will either change color or go from colored to colorless at a temperature that is dependent on the particular ink chemistry. For example, various dyes undergo a reversible chemical transformation that results in a reversible change between color and colorless at temperatures ranging from about 10° C. to 60° C.

The isolated temperature sensing system 40, positioned in the charging port connector 10 proximate the terminals 20, includes at least one illuminator 42 and at least one detector 44 for each terminal 20. The illuminators 42 and detectors 44 are positioned in the connector housing 12 proximate to or in the terminal receiving cavities 14 and proximate to and in-line with the terminals 20. In the illustrative embodiment shown, the illuminators 42 are white LEDs which illuminate the material patches 24 with white light. The detectors 44 are colored LEDs operating in a photodetector mode.

As current changes through the terminals 20, the temperature of the terminals 20 changes, causing the material patches 24 to change color. When the temperature of the terminals 20 is in an acceptable range, photons of lower energy than the detectors' bandgap are reflected and the electric current induced by the action of light or the photocurrent 46 in the detectors 44 is low, resulting in little conduction in the detectors 44. When the temperature change of the terminals 20 is outside of an acceptable range, photons of higher energy than the detectors' bandgap are reflected, resulting in a corresponding color change in the material patches 24 and the electric current 46 induced by the action of light or the photocurrent in the detectors 44 is high, thereby generating a detectable photocurrent 46. By matching the color change of the material patch 24 to the band gap of the detector 44, a photocurrent would flow when the material patch 24, and therefore the terminal 20, was above its prescribed temperature.

Figure 3:
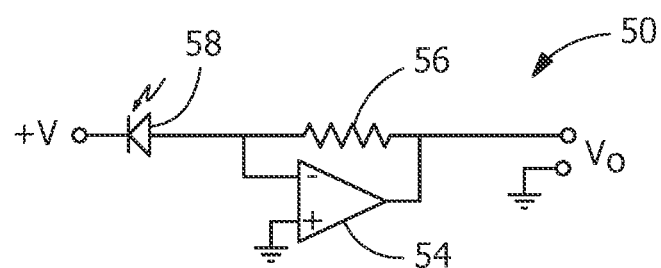
FIG. 3 is a diagrammatic view of an illustrative detector circuit associated with the remote temperature sensing system of FIG. 2.
Figure 4:
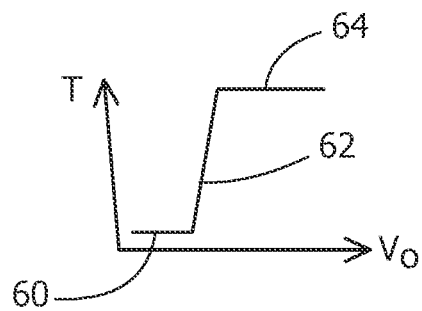
FIG. 4 is a diagrammatic view of an illustrative circuit output from the detector circuit of FIG. 3.

The sensing system 40 includes a detector circuit 50 is shown in FIG. 3 and its expected output 52 is shown in FIG. 4. The detector circuit 50 is positioned in the charging port connector 10 proximate the detectors 44. Light generated by the illuminator 42 and reflected from the material patch 24 to the detector 44 generates photoelectrons which cause current to flow into the op-amp 54. Feedback through the resistor 56 results in a voltage output signal proportional to light flux at the detector 44. Since the output of the detector 44 is sensitive to wavelength, the output of the op-amp 54 will be sensitive to temperature. As best shown in FIG. 4, the detector circuit 50 has a sharp transition 62 from little voltage output 60 resulting from reflected light below the bandgap wavelength to maximum voltage output 64 from reflected light which is shorter than the bandgap wavelength.

The detector 44 response may change with temperature. If this change causes an unacceptable shift in behavior, a compensation diode 58 may be placed in series with the resistor 56 in the op-amp 54 feedback path.

The components (illuminator 42, detector 44 and detector circuit 50) do not physically contact the terminal 20, and the components are therefore, electrically isolated from the terminal 20. As previously described, the material patch 24 is applied directly to the terminal surface 28 and adds little or no thermal mass to the terminal 20 or the system 40. The combination provides electrical isolation of the terminal 20 from the components, without increasing the measurement system time constant, and without the reducing the terminal cross-sectional area.

Figure 5:
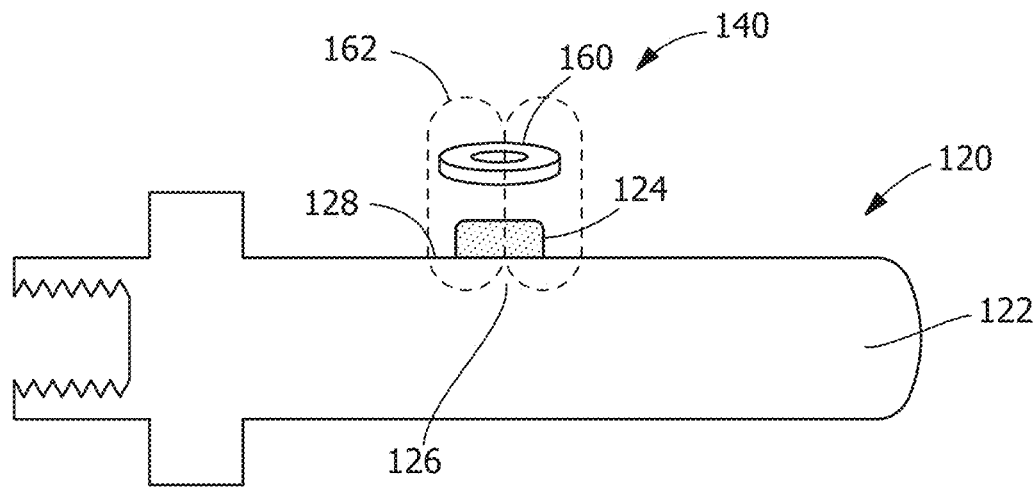
FIG. 5 is a diagrammatic view of an alternate illustrative electrical terminal with a conductive material provided thereon and of an illustrative remote temperature sensing system.
Figure 6:
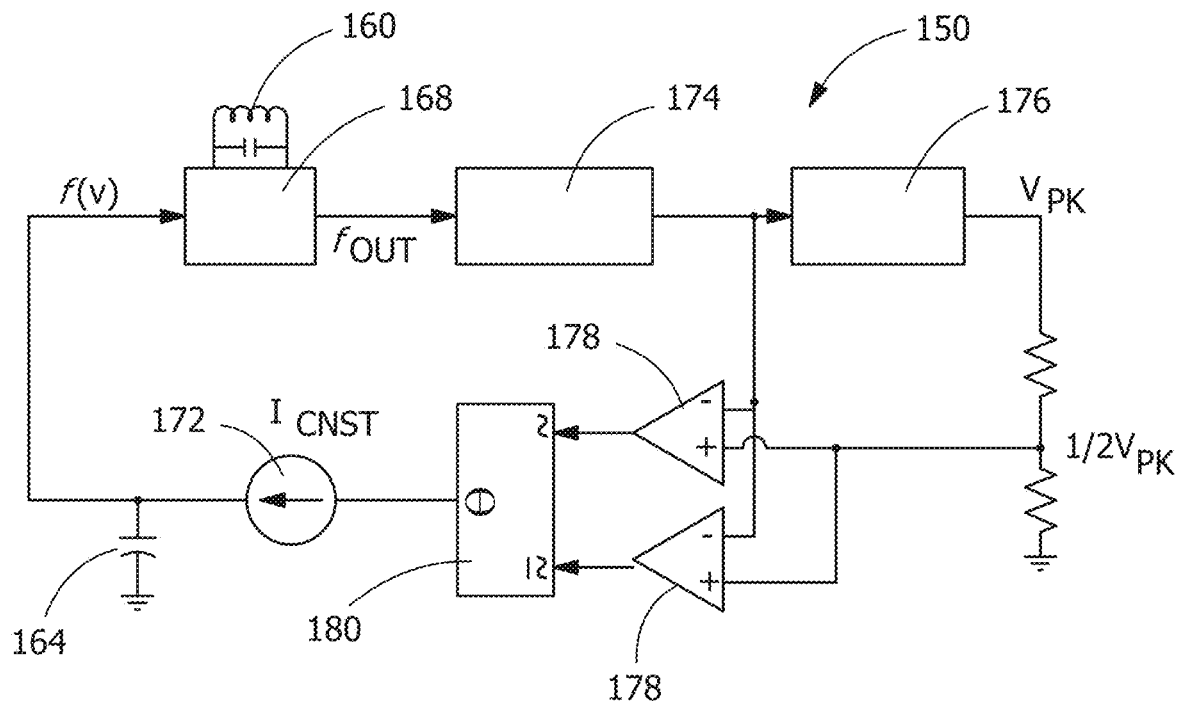
FIG. 6 is a diagrammatic view of an illustrative detector circuit associated with the remote temperature sensing system of FIG. 5.
Figure 7:
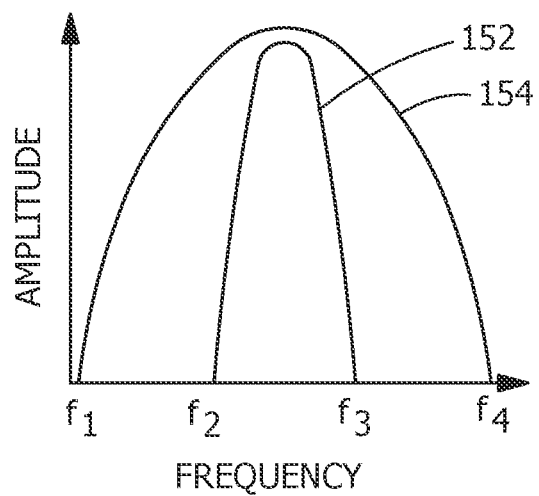
FIG. 7 is a diagrammatic view of an illustrative circuit output from the detector circuit of FIG. 6.

Referring to FIGS. 5 through 7, an alternate embodiment is shown. In the illustrative embodiment shown in FIG. 5, the terminals 120 are in the shape of pin with a free end 122 which is configured to mate with a mating connector (not shown) which is provided in a vehicle or the like. The size and shape of the terminals 120 may vary depending upon the application and the amount of current which the terminals 120 must carry.

A material patch or device 124 is applied or mounted to an area 126 of each of the terminals 120. The size and shape of the material patch or device 124 may vary depending upon the application and the amount of current which the terminals 120 must carry. The material patch or device 124 is applied directly to a surface 128 of each terminal 120 and adds little or no thermal mass to the terminal 120 or the system 140. For example, the material patch 124 may have a length of between 0.6 mm and 10 mm, a width of between 0.6 mm and 10 mm and a thickness of between 0.005 mm and 1 mm. The thermal mass of the material patch 124 is less than 25 percent, less than 20 percent, less than 15 percent, less than 10 percent, less than 5 percent of the thermal mass of the terminal 120.

In the embodiment shown in FIGS. 5 through 7, the material patch or device 124 is a matrix with a polymeric positive temperature coefficient material or device which contains a mixture of electrically conductive magnetic particles. Thermal expansion of the polymer matrix results in a magnetic field which is a non-linear function of temperature. Below a designed transition temperature, the matrix does not expand or has minimal expansion and the particles are in close mechanical contact. Above the designed transition temperature, the matrix expands causing the particles to move apart and form individual islands.

Current flow across the terminals 120 and the material patch or device 124 results in ohmic heating of the polymer matrix of the material patch or device 124. Excess current flow causes the polymer matrix to rise above its designed transition temperature, causing the polymer matrix to expand. The expansion of the polymer matrix causes the particles move apart, thereby breaking the flow of current across the material patch or device 124.

This operating principle can be used to remotely sense temperature. As previously described, the matrix is loaded with magnetic particles and excited with an AC magnetic field. The AC magnetic field will cause eddy currents to flow within the magnetic particles. This eddy current flow is a dissipative loss which results in ohmic heating of the particles and lost electrical energy. When the matrix is above its designed transition temperature, the eddy currents will flow only within each particle and the electrical loss will be relatively low. When the matrix is below its transition temperature and the particles are in close mechanical contact, the eddy currents will flow through the bulk of the material and the losses will be significantly higher. This temperature-dependent change in the matrix dissipative loss can be detected by an external circuit such as oscillator whose inductive element is magnetically coupled to the matrix.

Inductors may incorporate a magnetic core to increase the energy stored within the inductor's magnetic field. The nature of the magnetic core depends on the design requirements. Power transformers operating at AC line frequencies, on the order of 50-60 Hz, may use a core constructed of a stack of stamped steel laminations. The stampings are coated with layer of electrically-insulating varnish to reduce the flow of eddy currents between layers, which leads to dissipative losses in the core. A matrix of magnetic particles may be used at higher frequencies. An electrically conducting matrix will excel at EMI suppression due to its high eddy current loss. A core composed of electrically isolated particles in a ceramic matrix will have a lower loss and be more suited for power transfer or energy storage.

The behavior of the quality factor Q of a resonant LC circuit can be exploited to sense the temperature-dependent change in eddy current loss of the matrix. The Q of a resonant system is defined as the ratio of energy stored to energy lost per cycle, and can be dependent on the eddy current losses in a magnetic core. As shown in FIG. 7, the response of a resonant circuit or system 150 (FIG. 6) to an excitation of frequency f is dependent on the Q of the system. The resonant circuit 150 is positioned in the charging port connector 10 proximate an inductor 160. A high-Q system has a strong response to a narrow range of excitation frequencies (as represented by 152 in FIG. 7), while a low-Q system has a lower response to a wider range of excitation frequencies (as represented by 154 in FIG. 7).

Referring to FIG. 5, in one illustrative embodiment, the material patch or device 124 is a magnetic particle-polymer matrix applied to the terminal 120. The inductor 160 is positioned in the charging port connector 10 proximate the material patch or device 124, sufficiently closely that some or all of the inductor's magnetic field 162 flows through the material patch or device 124. In the embodiment, the terminal 120 is copper and has little interaction with the inductor 160. The inductor 160 forms part of a resonant system whose Q is a function of the magnetic properties of the material patch or device 124. As the material patch or device 124 rises above its transition temperature the magnetic particles separate, eddy current losses drop, and Q of the resonant circuit or system 150 rises.

Detection of Q, and therefore the terminal 120 temperature, can be done using the circuit 150 shown in block diagram format in FIG. 6. The inductor 160 and a capacitor 164 form a resonant circuit or tank circuit 150 that is excited by a VCO 168 (Voltage Controlled Oscillator). The frequency of the VCO 168 is swept about the resonant frequency of the inductor 160 and capacitor 164 by a constant current source 172 so the frequency rate of change is linear in time. As the VCO 168 frequency is swept about the resonant frequency of the tank circuit 150, the amplitude of the signal induced in the tank circuit 150 will vary, with the highest amplitude occurring at the resonant frequency of the inductor 160 and external capacitor 164. That amplitude is converted to a DC signal by the envelope detector circuit 174. The envelope detector circuit 174 output is fed to a peak detector 176, which captures and holds the highest amplitude, and to a comparator 178. The reference potential of the comparator 178 is set to some fraction of the peak amplitude. The comparator 178 output is connected to a flip-flop 180, whose output controls the direction of the VCO 168 sweep signal.

The circuit 150 forms a limit-cycle controller. The VCO 168 frequency will slowly oscillate above and below the resonant frequency. The period of these slow oscillations, or the times between flip-flop 180 transitions, will be proportional to the external circuit Q. As shown in FIG. 7, low Q will result in a broad resonance peak that sweeps between $f_1$ and $f_4$, as represented by 154. High Q will result in a narrow resonance peak that sweeps between $f_2$ and $f_3$, as represented by 152. Since the rate of sweep is constant over time, the high Q condition will result in more frequent transitions and therefore a faster transition period than the broad peak associated with lower Q.

The output of the peak detector 176 may be allowed to change slowly to allow it to compensate for changes in the amplitude of the response of the circuit that may occur due to changes in Q.

The material patch or device couples with the remote sensing circuit, as exemplified by the illustrative embodiments described above, provides electrical isolation without increasing the measurement system time constant and without reduction in the terminal cross-sectional area. The external circuit does not contact the terminal and is therefore electrically isolated from the terminal. The material patch or device is applied directly to the terminal surface and adds little or no thermal mass to the system.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A method of detecting temperature of an electrical terminal comprising:
   applying a material patch to a surface of the electrical terminal, the material patch containing a polymer matrix with a polymeric positive temperature coefficient material which contains a mixture of electrically conductive magnetic particles, whereby the material patch does not appreciably increase the electrical resistance or thermal capacitance of the electrical terminal;
   exciting the electrically conductive magnetic particles with an AC magnetic field to cause eddy currents to flow within the electrically conductive magnetic particles;
   remotely sensing a change in the material patch with an electrically isolated circuit which is external to the electrical terminal to determine if the electrical terminal is operating at a safe temperature to optimize current flow across the electrical terminal.

2. The method of claim 1, comprising:
   generating a magnetic field based on the thermal expansion of the polymer matrix, the magnetic field is a non-linear function of temperature.

3. The method of claim 2, wherein below a designed transition temperature, the polymer matrix does not expand or has minimal expansion and the electrically conductive magnetic particles are in close mechanical contact.

4. The method of claim 2, wherein above a designed transition temperature, the polymer matrix expands causing the electrically conductive magnetic particles to move apart and form individual islands.

5. The method of claim 2, wherein current flow across the terminal and the material patch results in ohmic heating of the polymer matrix of the material patch, wherein excess current flow causes the polymer matrix to rise above its designed transition temperature, causing the polymer matrix to expand wherein the electrically conductive magnetic particles move apart, breaking the flow of current across the material patch.

6. The method of claim 1,
   wherein when the polymer matrix is above the designed transition temperature the eddy currents will flow only within each of the electrically conductive magnetic particles and the electrical loss will be relatively low;
   wherein when the polymer matrix is below the designed transition temperature and the electrically conductive magnetic particles are in close mechanical contact the eddy currents will flow through the electrically conductive magnetic particles and the polymer matrix and the losses will be significantly higher.

7. The method of claim 6, comprising:
   detecting the change in the polymer matrix dissipative loss by an external circuit that is magnetically coupled to the polymer matrix.

8. The method of claim 7, wherein an oscillator whose inductive element is magnetically coupled to the polymer matrix is used to detect the change in the polymer matrix dissipative loss.

9. The method of claim 7, wherein an inductor is located near the material patch, sufficiently closely that some or all of the inductor's magnetic field flows through the material patch, the inductor forms part of a resonant system whose quality is a function of the magnetic properties of the material patch, wherein as the material patch rises above the designed transition temperature the electrically conductive magnetic particles of the polymer matrix separate, the eddy current losses drop, and the quality of the resonant circuit or system rises.

10. A method of detecting temperature of an electrical terminal comprising:
    applying a polymer matrix with a polymeric positive temperature coefficient material which contains a mixture of electrically conductive magnetic particles to a surface of the electrical terminal;
    exciting the electrically conductive magnetic particles with an AC magnetic field to cause eddy currents to flow within the electrically conductive magnetic particles;
    remotely sensing a change in the material with an electrically isolated circuit which is external to the electrical terminal to determine if the electrical terminal is operating at a safe temperature to optimize current flow across the electrical terminal.

11. The method of claim 10, wherein thermal expansion of the polymer matrix results in a magnetic field which is a non-linear function of temperature, wherein below a designed transition temperature, the polymer matrix does not expand or has minimal expansion and the electrically conductive magnetic particles are in close mechanical contact and above the designed transition temperature, the polymer matrix expands causing the electrically conductive magnetic particles to move apart and form individual islands.

12. The method of claim 10, wherein current flow across the electrical terminals and the material results in ohmic heating of the polymer matrix, wherein excess current flow causes the polymer matrix to rise above a designed transition temperature, causing the polymer matrix to expand, wherein the electrically conductive magnetic particles move apart, breaking the flow of current across the material.

13. The method of claim 10
wherein when the polymer matrix is above a designed transition temperature the eddy currents will flow only within each of the electrically conductive magnetic particles and the electrical loss will be low;
wherein when the polymer matrix is below the designed transition temperature and the electrically conductive magnetic particles are in close mechanical contact the eddy currents will flow through the electrically conductive magnetic particles and the polymer matrix and the losses will be higher.

14. The method of claim 13, comprising:
detecting the change in the polymer matrix dissipative loss by an external circuit that is magnetically coupled to the polymer matrix.

15. The method of claim 14, wherein an oscillator whose inductive element is magnetically coupled to the polymer matrix is used to detect the change in the polymer matrix dissipative loss.

16. The method of claim 14, wherein an inductor is located near the material, wherein some or all of the inductor's magnetic field flows through the material, the inductor forms part of a resonant system whose quality is a function of the magnetic properties of the material, wherein as the material rises above the designed transition temperature the electrically conductive magnetic particles of the polymer matrix separate, the eddy current losses drop, and the quality of the resonant circuit or system rises.

17. The method of claim 10, wherein a thermal mass of the material is less than 25 percent of a thermal mass of the electrical terminal.

18. A method of detecting temperature of an electrical terminal comprising:
applying a material which contains a mixture of electrically conductive magnetic particles to a surface of the electrical terminal;
exciting the electrically conductive magnetic particles with an AC magnetic field to cause eddy currents to flow within the electrically conductive magnetic particles;
remotely sensing a change in the material with an electrically isolated circuit which is external to the electrical terminal to determine if the electrical terminal is operating at a safe temperature to optimize current flow across the electrical terminal.

19. The method of claim 18, wherein thermal expansion of the material results in a magnetic field which is a non-linear function of temperature, wherein below a designed transition temperature, the material does not expand or has minimal expansion and the electrically conductive magnetic particles are in close mechanical contact and above the designed transition temperature, the material expands causing the electrically conductive magnetic particles to move apart and form individual islands.

20. The method of claim 18
wherein when the material is above a designed transition temperature the eddy currents will flow only within each of the electrically conductive magnetic particles and the electrical loss will be low;
wherein when the material is below the designed transition temperature and the electrically conductive magnetic particles are in close mechanical contact the eddy currents will flow through the electrically conductive magnetic particles and the losses will be higher.

* * * * *